United States Patent [19]

Kuriyama

[11] Patent Number: 4,613,202

[45] Date of Patent: Sep. 23, 1986

[54] SUPPORT STRUCTURE FOR ELECTROMECHANICAL TRANSDUCER

[75] Inventor: Kazumi Kuriyama, Yamanashi, Japan

[73] Assignee: Pioneer Electronic Corporation, Tokyo, Japan

[21] Appl. No.: 625,966

[22] Filed: Jun. 29, 1984

[30] Foreign Application Priority Data

Jun. 30, 1983 [JP] Japan .............................. 58-102434[U]

[51] Int. Cl.⁴ ............................................. G02B 26/10
[52] U.S. Cl. ........................................ 350/6.4; 369/45
[58] Field of Search .......................... 350/6.4, 6.6, 286; 369/45

[56] References Cited

FOREIGN PATENT DOCUMENTS 5817973 6/1976 Japan .
0071532 5/1982 Japan .................................... 369/45

Primary Examiner—John K. Corbin
Assistant Examiner—Rebecca D. Gass
Attorney, Agent, or Firm—Fleit, Jacobson, Cohn & Price

[57] ABSTRACT

A support structure for an electromechanical transducer assembly including an optical unit and drive means for driving the optical unit in at least two directions consisting of a first direction and a second direction perpendicular to the first direction, comprising stationary structure means, movable structure means movable in the two directions from and to a predetermined position with respect to the stationary structure means, the optical unit being movable with the movable structure means, and at least two spring elements each constituted by an endless band of an elastic or viscoelastic material, each of the spring elements being interposed between the stationary and movable structure means and having a center axis in a third direction perpendicular to both of the first and second directions, each of the spring elements being deformed under compression into a generally oval configuration between the stationary and movable structure means.

10 Claims, 7 Drawing Figures

SUPPORT STRUCTURE FOR ELECTROMECHANICAL TRANSDUCER

FIELD OF THE INVENTION

The present invention relates in general to electromechanical transducers and in particular to a support structure for use with an optical unit which constitutes an electromechanical transducer assembly in combination with the support structure. A typical example of an electromechanical transducer assembly to which the present invention appertains is the one that forms part of an information pickup module of, for example, an optical information readout or reproducing device such as a video and/or audio player.

BACKGROUND OF THE INVENTION

In a video and/or audio player presently in wide use, the information recorded on an information carrying medium such as a video and/or audio is read out by directing a laser beam at the surface of the disc through a suitable optical unit and scanning the record tracks on the surface of the disc with the laser beam. The beam reflected from or transmitted through the disc is processed to produce electric signals representative of the information read from the disc. In scanning the record tracks on the disc, the laser beam directed at the surface of the disc must be focussed correctly at target record tracks of the disc surface. The optical unit through which the laser beam is to be directed at the surface of the information carrying disc is thus driven for two-dimensional or three-dimensional oscillatory motions, viz., for oscillation in at least two directions perpendicular to each other with respect to the disc as the disc turns about the center axis thereof and/or the laser spot incident on the disc surface is moved toward or away from the center axis of the disc.

In order that the laser beam to scan the record tracks of the information carrying disc be correctly focussed on the surface of the disc, the objective lens which forms part of the optical unit must be at all times located at a predetermined distance from the surface of the disc throughout playback operation. Video and/or audio discs presently in use being subject to warpage although the degree of the warpage may differ from one disc to another, one of the important requirements of the electromechanical transducer assembly of a video and/or audio player is the capability to be responsive to the warpage of the disc as well known in the art. The optical unit of the electromechanical transducer assembly is for this reason required to be driven for slight movement in a direction parallel with the axis of rotation of the disc so as to be position adjusted toward or away from the surface of the disc during operation of the disc player.

Another important requirement of the electromechanical transducer assembly of a video and/or audio player is the capability to be responsive to the eccentricity of the circular or spiral record tracks of a video and/or audio and, thus, the objective lens provided in the optical unit of the electromechanical transducer assembly is further required to be driven for slight movement in a radial direction of the disc, viz., a direction perpendicular to the axis of rotation of the disc so as to be position adjusted toward or away from the axis of rotation of the disc during operation of the disc player.

The support structure used to support the optical unit of the electromechanical transducer assembly in the information pickup module of a video and/or audio player is for these reasons required to move, or oscillate, in at least two directions one parallel with and the other perpendicular to the axis of rotation of the disc in use.

One prior-art support structure of this nature is constructed to have two oscillatory systems adapted to permit the optical unit to oscillate in these two directions perpendicular to each other. The oscillating motion of the optical unit in one of these two directions is, however, inevitably accompanied by movement of the optical unit in the other direction. Such undesired movement of the optical unit results in errors in the oscillating motion of the unit in this latter direction. A problem is further encountered in that the coupled oscillation of the two oscillatory systems makes it difficult to control the oscillating motion of the optical unit in each of the two directions.

There is another type of support structure adapted to permit the optical unit to move, or oscillate, in at least two directions perpendicular to each other. This type of prior-art support structure uses two pairs of initially annular, elastic or viscoelastic spring elements provided under compression between support members which are movable with respect to each other, the optical unit being carried on one of the support members. The optical unit is elastically or viscoelastically positioned by the aid of these spring elements and is permitted to oscillate in the two directions with respect to the other of the support members by the elastic or viscoelastic deformation of the individual spring elements. The oscillating motions of the optical unit in the two directions thus result from the elastic or viscoelastic distorsion of the spring elements and tend to interfere with each other. This makes it extremely difficult to control the oscillating motion of the optical unit in each of the two directions. Where it is desired to have the springs designed to provide large amounts of displacement, each of the springs must have a large compliance constant, which will result in an increased tendency of the spring for torsional oscillation. The torsional oscillation of the spring in turn is another contribution to making it difficult to control the oscillating motion of the optical unit.

It is, accordingly, an important object of the present invention to provide an improved support structure for the optical unit of an electromechanical transducer assembly, the support structure being adapted to eliminate undesired movement of the optical unit in one direction when the optical unit is to be driven for movement in another direction.

It is another important object of the present invention to provide an improved support structure for the optical unit of an electromechanical transducer assembly, which support structure is useful for avoiding errors in the oscillating motion of the unit in each of the directions in which the optical unit is to be driven for movement.

It is still another important object of the present invention to provide an improved support structure for the optical unit of an electromechanical transducer assembly to avoid coupled oscillation of the oscillatory systems which form part of the support member.

It is still another important object of the present invention to provide an improved support structure for the optical unit of an electromechanical transducer assembly to make it easy to control the oscillating motion of the optical unit in each of the directions in which the optical unit is to be driven for movement.

Yet, it is still another important object of the present invention to provide an improved support structure for the optical unit of an electromechanical transducer assembly to reduce or eliminate the tendency for torsional oscillation of the spring elements forming part of the support structure and to further make it easy to control the oscillating motion of the optical unit.

While the support structure proposed by the present invention will be hereinafter described as being used with the electromechanical transducer which is included in the information pickup module of an optical information readout device, it should be borne in mind that a support structure according to the present invention is applicable to any type of electromechanical transducers involving two-dimensional motions or three-dimensional motions.

SUMMARY OF THE INVENTION

In accordance with the present invention, there is provided a support structure for an electromechanical transducer assembly including an optical unit and drive means for driving the optical unit in at least two directions consisting of a first direction and a second direction perpendicular to the first direction, comprising stationary structure means, movable structure means movable in the two directions from and to a predetermined position with respect to the stationary structure means, the optical unit being movable with the movable structure means, and at least two spring elements each constituted by an endless band of an elastic or viscoelastic material, each of the spring elements being interposed between the stationary and movable structure means and having a center axis in a third direction perpendicular to both of the first and second directions, each of the spring elements being deformed under compression into a generally oval configuration between the stationary and movable structure means. In a preferred embodiment of the present invention, each of the spring elements intervenes between the stationary and movable structure means in a direction parallel with the first direction and has a cross section which is elongated, under compression, in a direction parallel with the second direction. In this instance, the two spring elements are juxtaposed in a direction parallel with the first direction. In the preferred embodiment of the invention, furthermore, each of the spring elements is secured to the stationary and movable structure means respectively along lines substantially parallel with the center axis of the spring element.

BRIEF DESCRIPTION OF THE DRAWINGS

The drawbacks of a prior-art support structure for the electromechanical transducer assembly of the information pickup module of a video and/or audio player and the features and advantages of a support structure according to the present invention will be more clearly understood from the following description taken in conjunction with the accompanying drawings in which.

DESCRIPTION OF THE PRIOR ART

Figure 1:
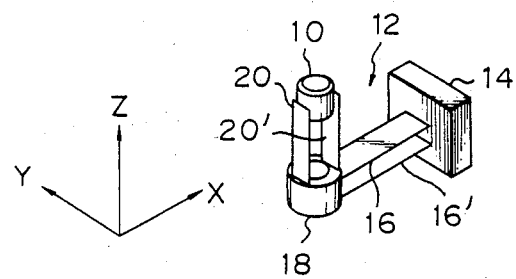
FIG. 1 is a perspective view showing a known electromechanical transducer assembly used in a conventional information pickup module of a video and/or audio player and including an optical unit and a support structure for the optical unit.

Referring to FIG. 1 of the drawings, the electromechanical transducer assembly of the optical information pickup module of a known video and/or audio player includes an optical unit 10 which is supported on a support structure 12. The optical unit 10 includes an objective lens through which a laser beam to scan the record tracks of a video and/or audio (not shown) is to be focussed on the information carrying surface of the disc. The support structure 12 is adapted to support the optical unit 10 in such a manner as to permit the unit 10 to oscillate in at least two different directions with respect to a member or structure (not shown) which carries the support structure 12 and which also forms part of the optical information pickup module of the video and/or audio player. These two directions of oscillation of the optical unit 10 are perpendicular to each other and consist, as shown in FIG. 1, of a first direction represented by X and a second direction represented by Z.

The support structure 12 includes a first support member 14 securely attached to the above mentioned member or structure carrying the support structure 12. A first pair of spring plates 16 and 16' extends from the first support member 14 in a direction parallel with the first direction X, the spring plates 16 and 16' being spaced apart in parallel from each other in a direction parallel with the second direction Z. The first pair of spring plates 16 and 16' are secured at their leading ends to a hollow, cylindrical second support member 18 which is spaced apart from and axially aligned with the first support member 14 in a direction parallel with the first direction X. A second pair of spring plates 20 and 20' extends from the second support member 18 in a direction parallel with the second direction Z, the spring plates 20 and 20' being spaced apart in parallel from each other in a direction parallel with the first direction X. The second pair of spring plates 20 and 20' are securely attached at their respective leading ends to the optical unit 10 which is spaced apart from the second support member 20 in a direction parallel with the direction Z. The second pair of spring plates 20 and 20' are attached to the optical unit 10 in such a manner as to have the unit 10 interposed between respective leading end portions of the spring plates 20 and 20'.

Thus, the first pair of spring plates 16 and 16' permits the second support member 18 and accordingly the optical unit 10 to oscillate in a direction largely parallel with the second direction Z with respect to the first support member 14. The axis of oscillating motion of the optical unit 10 provided by the first pair spring plates 16 and 16' is fixed with respect to the first support member 20 and is parallel with a third direction Y which is perpendicular to both of the first and second directions X and Z as shown. On the other hand, the second pair of spring plates 20 and 20' permits the optical unit 10 to oscillate in a direction largely parallel with the first direction X with respect to the second support member 18. In this instance, the axis of oscillating motion of the optical unit 10 provided by the second spring plates 20 and 20' is fixed with respect to the second support member 20 and is also parallel with the above mentioned third direction Y. In the arrangement shown in FIG. 1, the first direction X is assumed to be parallel with the axis of rotation of the video and/or audio being played back and the second direction Z is assumed to be perpendicular to the axis of rotation of the disc.

During operation of the video and/or audio player, a laser beam is transmitted to the video and/or audio (not shown) through the objective lens provided in the optical unit 10 supported on the support structure 12 which is constructed and arranged as above described. In order that the laser beam be correctly focussed at target record tracks of the disc, the position of the optical unit 10 must be precisely adjusted with respect to the video and/or audio in use and for this purpose the optical unit 10 is driven for oscillating motion through small angles in directions respectively parallel with the first and second directions X and Y to cope with the warpage of the disc and the eccentricity of the record tracks of the disc as previously discussed. Thus, the support structure has two oscillatory systems one composed of the first pair of spring plates 16 and 16' and the other composed of the second pair of spring plates 20 and 20'.

The oscillating motion of the optical unit 10 in a direction parallel with the second direction Z is inevitably accompanied by movement of the optical unit 10 in a direction parallel with the first direction X. This movement of the optical unit 10 in the direction parallel with the first direction X results in errors in the oscillating motion of the unit 10 in this direction. Furthermore, the coupled oscillation of the two oscillatory systems makes it difficult to control the oscillating motion of the optical unit 10 in each of the directions parallel with the first and second directions X and Z.

Figure 2:
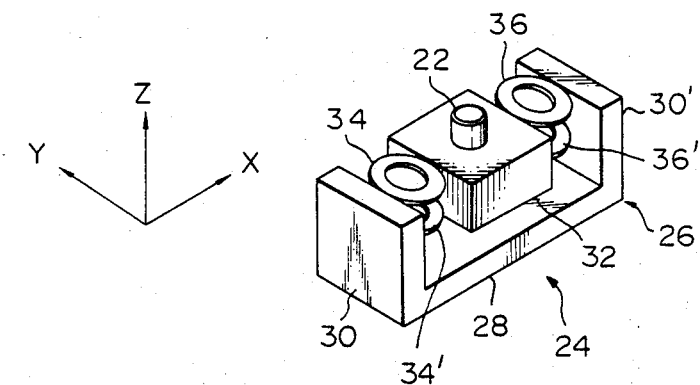
FIG. 2 is a perspective view showing another prior-art electromechanical transducer assembly used in a conventional information pickup module of a video and/or audio player and including an optical unit and a support structure for the optical unit.

In FIG. 2 of the drawings is shown another prior-art type of electromechanical transducer assembly used in the optical information pickup module of a conventional video and/or audio player. The electromechanical transducer assembly herein shown includes an optical unit 22 including an objective lens through which a laser beam to scan the record tracks of a video and/or audio (not shown), and a support structure 24 adapted to support the optical unit 22 in such a manner as to permit the unit 22 to oscillate in at least two different directions with respect to a member or structure (not shown) which carries the support structure 24. These two directions of oscillation of the optical unit 22 also consist of a first direction represented by X and a second direction perpendicular to the first direction X and represented by Z. As in the case of the electromechanical transducer assembly described with reference to FIG. 1, the first direction X is assumed to be parallel with the axis of rotation of the video and/or audio being played back and the second direction Z is assumed to be perpendicular to the axis of rotation of the disc.

The support structure 24 includes a support member 26 securely attached to the above mentioned member or structure carrying the support structure 24. The support member 26 has a base portion 28 elongated in a direction parallel with the first direction X and a pair of end wall portions 30 and 30' projecting from the opposite ends of the base portion 28 in directions parallel with the second direction Z, the end wall portions 30 and 30' being spaced apart in parallel from each other in a direction parallel with the first direction X. The support structure 24 further includes a second support member 32 positioned over the base portion 28 and between the end wall portions 30 and 30' of the first support member 26. The second support member 32, having the optical unit 22 carried thereon, is spaced apart at equal distances from the end wall portions 30 and 30 of the support member 26 in a direction parallel with the first direction X and is spaced apart a predetermined distance from the upper face of the base portion 28 of the first support member 26 in a direction parallel with the second direction Z. A first pair of spring elements 34 and 34' is provided between the second support member 32 and one end wall portion 30 of the first support member 26 and, likewise, a second pair of spring elements 36 and 36' are provided between the second support member 32 and the other end wall portion 30' of the support member 26. The spring elements 34 and 34' or 36 and 36' of each pair are spaced apart in parallel from each other in a direction parallel with the second direction Z.

Each of the spring elements 34, 34', 36 and 36' above mentioned is constructed of an elastic or viscoelastic material and is initially annular in shape. When positioned between the second support member 32 and the end wall portion 30 or 30' of the first support member 26, such a spring element is compressed into an oval shape which is elongated in a direction parallel with a third direction Y perpendicular to the first and second directions X and Z. The second support member 32 is thus supported elastically or viscoelastically over the base portion 28 and between the opposite end wall portions 30 and 30' of the first support member 26 by the two pairs of spring elements 34, 34', 36 and 36' which are under compression. These two pairs of spring elements 34, 34', 36 and 36' permit the second support member 32 and accordingly the optical unit 22 to oscillate in directions which include directions parallel with the first and second directions X and Z with respect to the first support member 26.

The oscillating motions of the optical unit 22 in directions parallel with the first and second directions X and Z result from elastic or viscoelastic deformation of each of the four spring elements 34, 34', 36 and 36' in these directions. Such oscillating motions of the optical unit 22 are interfered with by each other and for this reason it is extremely difficult to control the oscillating motion of the unit 22 in each of the directions parallel with the first and second directions X and Z. Where it is desired to have the springs of the above described nature designed to provide large amounts of displacement, each of the springs must have a large compliance constant, which will result in an increased tendency of the spring for torsional oscillation. The torsional oscillation of the spring in turn is another contribution to making it difficult to control the oscillating motion of the optical unit 22.

DESCRIPTION OF THE PREFERRED EMBODIMENTS

Figure 3:
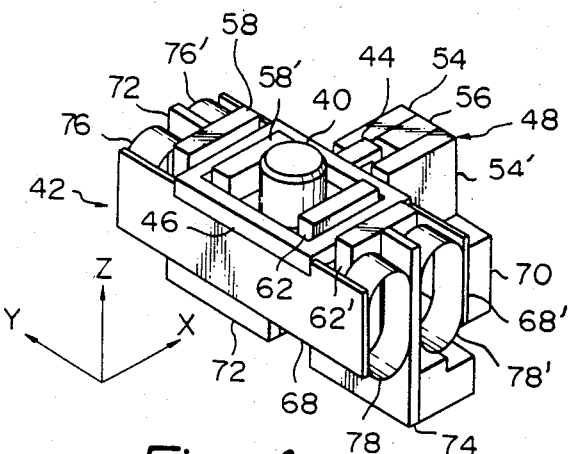
FIG. 3 is a perspective view showing an electromechanical transducer assembly including an optical unit of an electromechanical transducer assembly and a support structure embodying the present invention.
Figure 4:
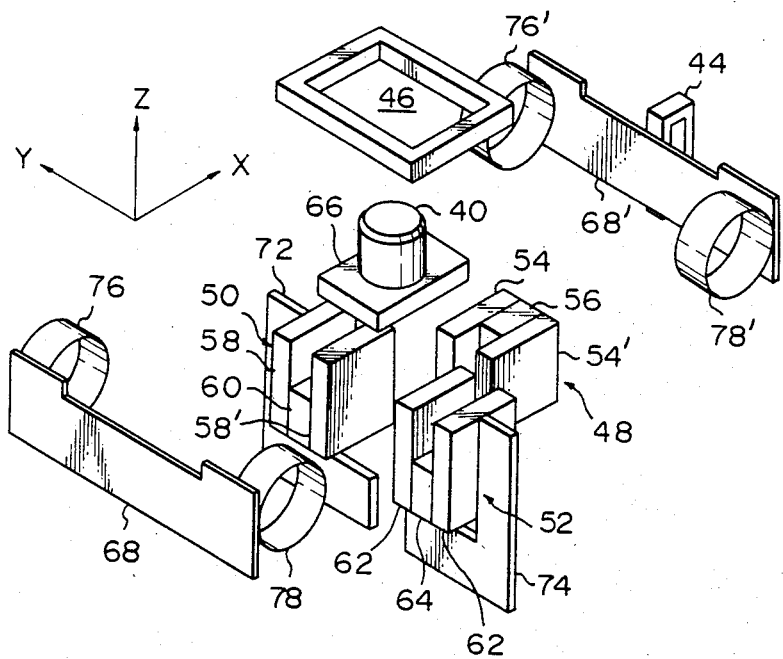
FIG. 4 is an exploded perspective view showing, in a disassembled state, of the electromechanical transducer assembly illustrated in FIG. 3.

Referring to FIGS. 3 and 4 of the drawings, the electromechanical transducer assembly is shown comprising an optical unit 40 and a support structure which embodies the present invention. The optical unit 40 is per se well known in the art of, for example, video and/or audio players and includes an objective lens. Where the electromechanical transducer assembly herein shown is to be used in the information pickup module of a video and/or audio player, a laser beam to scan the record tracks of a video and/or audio (not shown) may be focussed on the information carrying surface of the disc through the lens incorporated in this optical unit 40. The support structure 42 embodying the present invention is in its entirety supported on a suitable member or structure (not shown) which also forms part of, for example, the optical information pickup module of the video and/or audio player. The support structure 42 is adapted to support the optical unit 40 in such a manner as to permit the unit 40 to oscillate in at least two different directions with respect to a member or structure (not shown) which carries the support structure 42 and which also forms part of, for example, the optical information pickup module of the video and/or audio player. These two directions of oscillation of the optical unit 40 are perpendicular to each other and consist, as shown, of a first direction represented by X and a second direction represented by Z. The first direction X is assumed to be parallel with the optical axis of the lens included in the optical unit 40 and accordingly with the axis of rotation of the video and/or audio in use if the electromechanical transducer assembly is to be used in a video and/or audio player. The second direction Z is perpendicular to the first direction X and is assumed to be perpendicular to the axis of rotation of the video and/or audio in use if the electromechanical transducer assembly is to be used in a video and/or audio player. In FIGS. 3 and 4, there is shown a third direction Y perpendicular to both of the first and second directions X and Z. The third direction Y is assumed to be parallel with directions tangential to the record tracks of the video and/or audio in use if the electromechanical transducer assembly is to be used in a video and/or audio player.

In FIGS. 3 and 4, the electromechanical transducer assembly is further shown comprising electromagnetic drive means adapted to drive the support structure 42 for movement in directions parallel with the above mentioned first and second directions X and Z. The electromagnetic drive means comprises generally rectangular first and second coil units 44 and 46, and first, second and third magnet units 48, 50 and 52. Each of the first and second coil units 44 and 46 has a pair of spaced parallel longitudinal portions and a pair of spaced parallel lateral portions perpendicular to the longitudinal portions and each interconnecting the longitudinal portions at it ends and at the end of the longitudinal portions. The first coil unit 44 is positioned to have its longitudinal portions in directions parallel with the second direction Z and its lateral portions in directions parallel with the first direction X. The second coil unit 46 is positioned to have its longitudinal portions in directions parallel with the third direction Y and its lateral portions in directions parallel with the first direction X. In the assembled state shown in FIG. 3, the second coil unit 46 is positioned to surround the optical unit 40 in such a manner as to have its center axis aligned with the optical axis of the lend incorporated in the optical unit 40. The first coil unit 44 has its center axis in a direction parallel with the third direction Y.

Each of the first, second and third magnet units 48, 50 and 52 has a generally U-shaped cross section and comprises a pair of permanent magnets spaced apart in parallel from each other and a yoke interposed between and interconnecting together the magnets while forming a gap between the magnets. Thus, the first magnet unit 48 comprises a pair of permanent magnets 54 and 54' spaced apart in parallel from each other and a yoke 56 interposed between and interconnecting together the magnets 54 and 54' while forming a gap between the magnets 54 and 54'. The first magnet unit 48 is positioned to have its permanent magnets 54 and 54' spaced apart from each other in a direction parallel with the third direction Y and to have one longitudinal portion of the first coil unit 44 in the gap formed between the permanent magnets 54 and 54'. The second magnet unit 50 comprises a pair of permanent magnets 58 and 58' spaced apart in parallel from each other and a yoke 60 interposed between and interconnecting together the magnets 58 and 58' while forming a gap between the magnets 58 and 58'. Likewise, the second magnet unit 50 comprises a pair of permanent magnets 62 and 62' spaced apart in parallel from each other and a yoke 64 interposed between and interconnecting together the magnets 62 and 62' while forming a gap between the magnets 62 and 62'. Each of the second and third magnet units 50 and 52 is positioned to have its permanent magnets 58 and 58' or 62 and 62' spaced apart from each other in a direction parallel with the third direction Y and to have one lateral portion of the second coil unit 46 in the gap formed between the two magnets.

The support structure 42 comprises a transverse support member 66 having the optical unit 40 fixedly carried thereon and slightly elongated in a direction parallel with the first direction X. The transverse support member 66 is positioned to have the optical unit 40 located between one of the permanent magnets 58 and 58' of the second magnet unit 50 and one of the permanent magnets 62 and 62' of the third magnet unit 52. The support structure 42 further comprises a pair of side plates 68 and 68' which are spaced apart in parallel from each other in a direction parallel with the first direction X. The first coil unit 44 has the other of its longitudinal portions securely attached to the outer face of one of these side plates such as the side plate 68' as shown. Furthermore, the second coil unit 46 is securely fitted to these side plates 68 and 68' so that the longitudinal portions of the coil unit 46 extend along the side plates 68 and 68', respectively, and the lateral portions of the coil unit 46 extend perpendicularly from one of the side plates 68 and 68' to the other. Thus, the optical unit 40, second and third magnet units 50 and 52 and the transverse support member 66 are located between the side plates 68 and 68'. The transverse support member 66 5 carrying the optical unit 40 is securely attached at its opposite end faces to the inner faces of the side plates 68 and 68', respectively, so as to hold the optical unit 40 against movement with respect to the side plates 68 and 68'.

The support structure 42 further comprises a first magnet support member 70 positioned outside the side plate 68' as partially shown in FIG. 3 and generally L-shaped second and third magnet support members 72 and 74 positioned between the side plates 68 and 68'.

The first magnet support member 70 is fixedly held with respect to the previously mentioned member or structure (not shown) carrying the support structure 42 and has the first magnet unit 48 fixedly mounted thereon. The second and third magnet support members 72 and 74 are also fixedly held with respect to the above mentioned member or structure carrying the support structure 42 and respectively have the second and third magnet units 50 and 52 fixedly mounted thereon. These magnet support members 72 and 74 are spaced apart from each other in a direction parallel with the third direction Y so that the optical unit 40, second coil unit 46, second and third magnet units 50 and 52 and transverse support member 66 all intervene between the support members 72 and 74 in this direction and are held against movement in the particular direction. The side plates 68 and 68' are movable with respect to all of the first, second and third magnet support members 70, 72 and 74 so that the optical unit 40, first and second coil units 44 and 46, transverse support member 66 and side plates 68 and 68' are movable as a single unit with respect to the magnet support members 70, 72 and 74 in a direction parallel with the first direction X and in a direction parallel with second direction Z.

As will be understood from the foregoing description, the optical unit 40, first and second coil units 44 and 46, transverse support member 66 and side plates 68 and 68' constitute in combination a movable structure which is movable in directions parallel with the first and second directions X and Z with respect to a stationary structure which is composed of the first, second and third magnet units 48, 50 and 52 and the first, second and third magnet support members 70, 72 and 74. It may be noted that the term "stationary" herein used does not necessarily mean or imply that the structure including the magnet units 48, 50 and 52 and the magnet support members 70, 72 and 74 is not movable in a system incorporating the electromechanical transducer assembly therein. Where the electromechanical transducer assembly herein shown is to be used as part of the information pickup module of a video and/or audio player, the term "stationary" may be interpreted to mean that such a structure is held stationary with respect to the axis of rotation of the disc in use.

In the electromechanical transducer assembly incorporating the support structure 42 embodying the present invention, the movable structure is elastically or viscoelastically supported on the stationary structure by means of spring elements which in the shown embodiment consist of a first pair of spring elements 76 and 76' and a second pair of spring elements 78 and 78'. Each of these spring elements 76, 76', 78 and 78' is constructed of an endless band of an elastic or viscoelastic material and is initially cylindrical in shape as will be seen in FIG. 4. One of the first pair of spring elements 76 and 76' is interposed between the second magnet support member 72 and one of the side plates 68 and 68' and the other of the spring elements 76 and 76' is interposed between the second magnet support member 72 and the other of the side plates 68 and 68'. Likewise, one of the second pair of spring elements 78 and 78' is interposed between the third magnet support member 74 and one of the side plates 68 and 68' and the other of the spring elements 78 and 78' is interposed between the third magnet support member 74 and the other of the side plates 68 and 68'. Each of the spring elements 76, 76, 78 and 78' thus arranged has its center axis in a direction parallel with the second direction Y and is is elastically or viscoelastically deformed under compression into a generally oval configuration which is elongated in a direction parallel with the second direction Z as will be seen from FIG. 3. Furthermore, each spring element is bonded or otherwise securely attached to one side face of the magnet support member 72 or 74 and to the inner face of the side plate 68 or 68' along a line parallel with the center axis of the spring element.

Each of the coil units 44 and 46 has terminals connected across a suitable power source (not shown). Thus, when the first coil unit 44 is electrically energized from the power source, the above mentioned movable structure including the optical unit 40 and the coil units 44 and 46 is caused to move in a direction parallel with the first direction X with respect to the above mentioned stationary structure by the interaction between the magnetic flux generated between the permanent magnets 54 and 54' of the first magnet unit 48 and the magnetic flux generated by the associated coil unit 44. When, on the other hand, the second coil unit 46 is electrically energized from the power source, then the movable structure is caused to move in a direction parallel with the second direction Z with respect to the stationary structure by the interaction between the magnetic flux produced between the permanent magnets 58 and 58' of the second magnet unit 50 and the magnetic flux generated by the second coil unit 46 and between the magnetic flux generated between the permanent magnets 62 and 62' of the third magnet unit 52 and the magnetic flux generated by the coil unit 46.

Figure 5A:
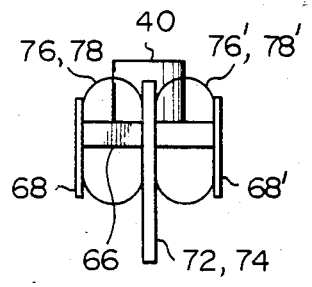
FIG. 5A is a view showing a normal condition of the electromechanical transducer assembly shown in FIGS. 3 and 4.

FIG. 5A shows the electromechanical transducer assembly having the above mentioned movable structure held in a predetermined normal position with respect to the stationary structure with the first and second coil units 44 and 46 maintained de-energized. When the movable structure is held in this predetermined normal position with respect to the stationary structure, all of the spring elements 76, 76', 78 and 78' assume similar configurations and the side plates 68 and 68' forming part of the movable structure are spaced apart equally from the second and third magnet support members 72 and 74 as will be seen in FIG. 5A. Under this condition, the optical unit 40 is held in a predetermined position in a direction parallel with the first direction X and in a direction parallel with the second direction Z with respect to the stationary structure including the magnet units 44 and 46 and magnet support members 70, 72 and 74. The above mentioned lines along which each of the spring elements 76, 76', 78 and 78' is fixed to the side plate 68 or 68' and the magnet support member 73 or 74 are preferably opposite to each other across the center axis of the spring element when the movable structure is held in the predetermined normal position with respect to the stationary structure.

Figure 5B:
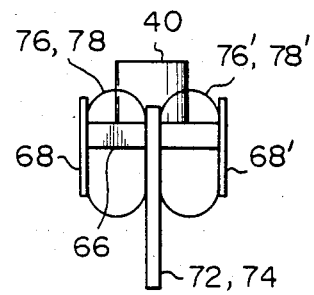
FIG. 5B is a view showing a condition in which the optical unit included in the electromechanical transducer assembly shown in FIGS. 3 and 4 is moved in one direction (e.g., upward Z)

When the second coil unit 46 is energized from the power source and the movable structure including the optical unit 40 is caused to move in a direction parallel with the second direction Z with respect to the stationary structure as above discussed, each of the spring elements 76, 76', 78 and 78' is caused to "roll", like a caterpillar, on each of the second and third magnet support members 72 and 74 and on the inner face of the side plate 68 or 68' with its opposite side portions moved in opposite directions in parallel with the second direction Z as will be seen from FIG. 5B. Such movement of each of the spring elements 76, 76', 78 and 78' is allowed until the lines along which the spring element is secured to the support member 73 or 74 and the side plate 68 or 68' reaches the ends of the two semicylindrical portions of the endless band forming the spring element. Each of the spring elements 76, 76', 78 and 78' thus moved with respect to the stationary structure including the magnet support members 73 and 74 shown in FIG. 5B is however permitted to maintain its initial shape shown in FIG. 5A. As a consequence, the spacings between each of the second and third magnet support members 73 and 74 and the side plates 68 and 68' are maintained unchanged so that the optical unit 40 is held in situ in a direction parallel with the first direction X. The adjustment of the position of the optical unit 40 in a direction parallel with the second direction Z is thus effected without producing a change in the position of the optical unit in a direction parallel with the first direction X. Because, furthermore, of the fact that throughout movement of the movable structure in a direction parallel with the second direction Z, the stresses produced in the two semicylindrical portions of each of the spring elements 76, 76', 78 and 78' are equal to each other with the result that the movement of the movable structure does not cause any inclination of the optical axis of the optical unit 40 with respect to the above mentioned stationary structure.

Figure 5C:
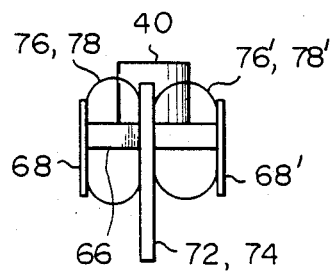
FIG. 5C is a view showing a condition in which the optical unit included in the electromechanical transducer assembly shown in FIGS. 3 and 4 is moved in another direction (e.g., horizontal X).

When, on the other hand, the first coil unit 44 is energized from the power source and the movable structure including the optical unit 40 is caused to move in a direction parallel with the first direction X with respect to the stationary structure, each of the two spring elements on one of the side plates such as the the spring elements 76 and 78 on the side plate 68 is collapsed in a direction parallel with the first direction X, while each of the two spring elements on the other side plate such as the the spring elements 76' and 78' on the side plate 68' is expanded in a direction parallel with the first direction X as shown in FIG. 5C. In this instance, each of the spring elements 76 and 78 is elongated in a direction parallel with the second direction Z and has its semicylindrical portions curved with a reduced radius of curvature and each of the spring elements 76' and 78' is shortened in a direction parallel with the second direction Z and has its semicylindrical portions curved with an increased radius of curvature. Thus, the movement of the optical unit 40 in a direction parallel with the first direction X is effected without causing a change in the position of the optical unit in a direction parallel with the second direction Z.

As will be understood from the foregoing description, the position of the optical unit 40 of the electromechanical transducer assembly including the support structure 42 embodying the present invention can be varied in a direction parallel with one of the first and second directions X and Z without any concomitant change in the position of the optical unit 40 in the other of the first and second directions X and Z. If the optical unit 40 is to be driven for movement concurrently in directions parallel the first and second directions X and Z, the distance of movement in each of these direction can therefore be controlled precisely. Another advantage of the embodiment herein described results from the use of the spring elements each in the form of an endless band which permits the optical unit 40 to move a relatively long distance with respect to the stationary structure.

While the support structure embodying the present invention has hereinafter described as being used with the electromechanical transducer which forms part of the information pickup module of an optical information readout device, this is merely for the purpose of description and a support structure according to the present invention is applicable to any type of electromechanical transducer involving two-dimensional motions.

What is claimed is:

1. A support structure for an electromechanical transducer assembly including an optical unit and drive means for driving the optical unit in at least two directions consisting of a first direction and a second direction perpendicular to the first direction, comprising
stationary structure means,
movable structure means movable in said two directions from and to a predetermined position with respect to the stationary structure means, said optical unit being movable with the movable structure means, and
at least two spring elements each constituted by an endless band of an elastic or viscoelastic material, each of the spring elements being interposed between the stationary and movable structure means and having a center axis in a third direction perpendicular to both of said first and second directions, each of the spring elements being deformed under compression into a generally oval configuration between said stationary and movable structure means.

2. A support structure means as set forth in claim 1, in which each of said spring elements intervenes between said stationary and movable structure means in a direction parallel with said first direction and has a cross section which is elongated, under said compression, in a direction parallel with said second direction.

3. A support structure means as set forth in claim 2, in which said stationary structure means comprises a pair of stationary members which are spaced apart from each other in a direction perpendicular to said first direction across said movable structure means, wherein said at least two spring elements are disposed one between said movable structure means and one of said stationary members and the other between said movable structure means and the other stationary member.

4. A support structure means as set forth in claim 1, in which each of said spring elements is secured to said stationary and movable structure means respectively along lines substantially parallel with the center axis of the spring element.

5. A support structure means as set forth in claim 4, in which said lines along which each of said at least two spring elements is secured to said stationary and movable structure means are opposite to each other across the center axis of the spring element when said movable structure means is held in said predetermined position with respect to said stationary structure means.

6. A support structure means as set forth in claim 5, in which each of said spring elements is caused to roll on said statioary structure means in one direction parallel with said second direction and on said movable structure means in the opposite direction parallel with said second direction when the movable structure means is moved in a direction parallel with the second direction.

7. A support structure means as set forth in claim 5, in which one of said at least two spring elements is collapsed and the other of the spring elements expanded in a direction parallel with said first direction when said movable structure means is moved in a direction parallel with the first direction with respect to said stationary structure means.

8. A support structure means as set forth in claim 5, in which one of said at least two spring elements is collapsed and the other of the spring elements expanded in a direction parallel with said first direction when said movable structure means is moved in a direction parallel with the first direction with respect to said stationary structure means and in which each of said spring elements is caused to roll on said stationary structure means in one direction parallel with said second direction and on said movable structure means in the opposite direction parallel with said second direction when the movable structure means is moved in a direction parallel with the second direction with respect to said stationary structure means.

9. A support structure means as set forth in claim 3, in which said at least two spring elements constitute a pair of spring elements out of two pairs of spring elements, wherein the two spring elements of each pair are disposed one between said movable structure means and one of said stationary members and the other between said movable structure means and the other stationary member.

10. A support structure means as set forth in claim 9, in which one of one pair of spring elements and one of the other pair of spring elements are substantially axially aligned with each other on one side of said movable structure means and the other of said one pair of spring elements and the other of said other pair of spring elements are substantially axially aligned with each other on the other side of said movable structure means.

* * * * *